United States Patent
Kwapis et al.

(10) Patent No.: US 9,217,386 B2
(45) Date of Patent: Dec. 22, 2015

(54) SYSTEM AND METHOD FOR PREVENTING STOCHASTIC PRE-IGNITION

(71) Applicant: GM GLOBAL TECHNOLOGY OPERATIONS LLC, Detroit, MI (US)

(72) Inventors: Dean R. Kwapis, White Lake, MI (US); Rafat F. Hattar, Royal Oak, MI (US); Kevin M. Luchansky, Sterling Heights, MI (US); J. Michael Gwidt, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 288 days.

(21) Appl. No.: 13/760,611

(22) Filed: Feb. 6, 2013

(65) Prior Publication Data

US 2014/0222315 A1    Aug. 7, 2014

(51) Int. Cl.
*F02D 41/04* (2006.01)
*F02D 41/40* (2006.01)
*F02D 35/02* (2006.01)

(52) U.S. Cl.
CPC .............. *F02D 41/04* (2013.01); *F02D 41/40* (2013.01); *F02D 35/02* (2013.01); *F02D 41/401* (2013.01); *F02D 41/402* (2013.01); *Y02T 10/44* (2013.01)

(58) Field of Classification Search
CPC ..... F02D 35/027; F02D 41/04; F02D 41/402; F02P 5/152; F02P 2017/128
USPC .......... 701/102–104, 114; 123/299, 434–436, 123/406.21, 406.29, 406.37, 406.47, 679, 123/704
See application file for complete search history.

(56) References Cited

U.S. PATENT DOCUMENTS

| | | | | |
|---|---|---|---|---|
| 7,302,932 | B2* | 12/2007 | Shelby et al. | 123/406.26 |
| 8,073,613 | B2 | 12/2011 | Rollinger et al. | |
| 8,265,859 | B2 | 9/2012 | Rollinger et al. | |
| 2011/0139120 | A1* | 6/2011 | Rollinger et al. | 123/436 |
| 2011/0144893 | A1* | 6/2011 | Rollinger et al. | 701/111 |
| 2011/0202260 | A1* | 8/2011 | Cunningham et al. | 701/104 |
| 2011/0288746 | A1* | 11/2011 | Carr et al. | 701/103 |
| 2011/0313641 | A1* | 12/2011 | Glugla et al. | 701/104 |
| 2012/0029795 | A1* | 2/2012 | Surnilla et al. | 701/111 |
| 2012/0073542 | A1 | 3/2012 | Rollinger et al. | |
| 2012/0245827 | A1* | 9/2012 | Glugla et al. | 701/105 |

FOREIGN PATENT DOCUMENTS

CN    102374056 A    3/2012

* cited by examiner

*Primary Examiner* — John Kwon
*Assistant Examiner* — Johnny H Hoang

(57) ABSTRACT

A system according to the principles of the present disclosure includes a stochastic pre-ignition module and a fuel control module. The stochastic pre-ignition module determines whether operating conditions of an engine satisfy predetermined criteria associated with stochastic pre-ignition. The fuel control module enriches an air/fuel ratio of the engine when the engine operating conditions satisfy the predetermined criteria.

20 Claims, 3 Drawing Sheets

SYSTEM AND METHOD FOR PREVENTING STOCHASTIC PRE-IGNITION

FIELD

The present disclosure relates to internal combustion engines, and more specifically, to systems and methods for preventing stochastic pre-ignition.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Airflow into the engine is regulated via a throttle. More specifically, the throttle adjusts throttle area, which increases or decreases airflow into the engine. As the throttle area increases, the airflow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Boosted engines include a boost device, such as a turbocharger or a supercharger, which provides pressurized air to an intake manifold of an engine. The pressurized air increases the compression ratio of the engine, which increases the torque output of the engine for a given amount of air and fuel provided to the cylinders. In this regard, a boost device may be used to increase the torque output of an engine and/or to improve the fuel economy of an engine.

Pre-ignition occurs in spark-ignition engines when an air/fuel mixture in a cylinder is ignited by an ignition source other than spark. Pre-ignition may cause noise and engine damage, and may even lead to engine failure. Regular pre-ignition occurs in one or more cylinders on a periodic basis (e.g., once per engine cycle). Stochastic pre-ignition occurs at random. Regular pre-ignition may repeatedly occur under certain engine operating conditions, while stochastic pre-ignition may be less repeatable.

SUMMARY

A system according to the principles of the present disclosure includes a stochastic pre-ignition module and a fuel control module. The stochastic pre-ignition module determines whether operating conditions of an engine satisfy predetermined criteria associated with stochastic pre-ignition. The fuel control module enriches an air/fuel ratio of the engine when the engine operating conditions satisfy the predetermined criteria.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Stochastic pre-ignition typically occurs when a boosted engine is subjected to an extended period of steady-state operation at high torque (e.g., 10 to 15 minutes at vehicle speeds of 55 to 70 miles per hour or greater). A system and method according to the present disclosure determines whether engine operating conditions satisfy predetermined criteria, indicating that stochastic pre-ignition is likely to occur. When the predetermined criteria is satisfied, the system and method adjusts engine operation to prevent stochastic pre-ignition. The predetermined criteria may be satisfied when the speed and load of an engine are within a predetermined speed and load range. Engine operation may be adjusted by enriching an air/fuel ratio of an engine, executing multiple fuel injection pulses for each combustion event, and/or advancing fuel injection timing.

Figure 1:
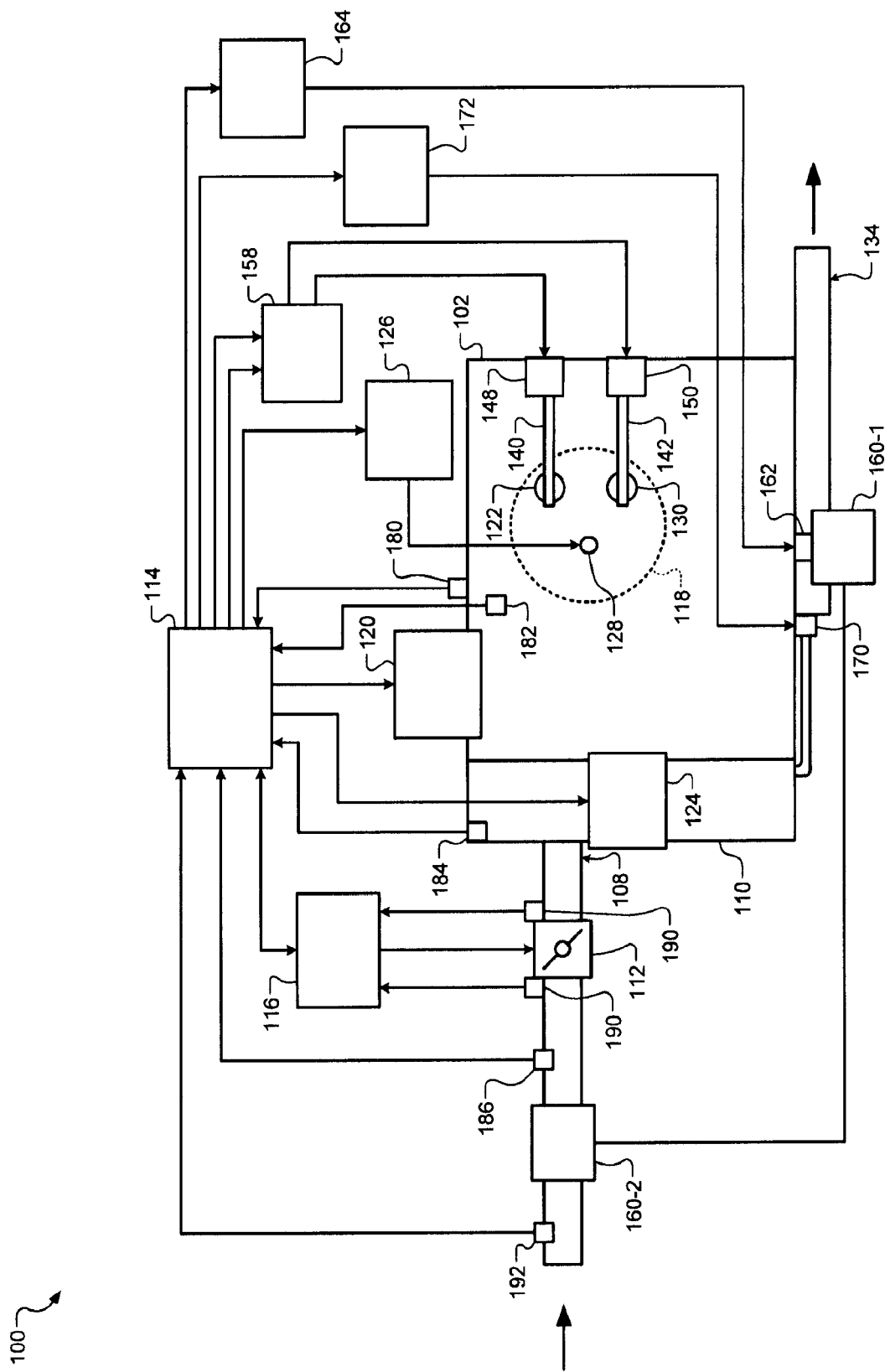
FIG. 1 is a functional block diagram of an example engine system according to the principles of the present disclosure.

Referring to FIG. 1, an example engine system 100 includes an engine 102 that combusts an air/fuel mixture to produce drive torque for a vehicle based on driver input. Air is drawn into the engine 102 through an intake system 108. The intake system 108 includes an intake manifold 110 and a throttle valve 112. The throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 is depicted as a spark-ignition engine. A spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, the combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

In the example shown, the engine system 100 includes an exhaust gas recirculation (EGR) valve 170 that selectively redirects exhaust gas back to the intake manifold 110. The EGR valve 170 may be located upstream of the turbocharger's turbine 160-1. The EGR valve 170 may be controlled by an EGR actuator module 172.

The position of the crankshaft may be measured using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100. In one example, the ECM 114 may enrich an air/fuel ratio of the engine 102 when the engine 102 is operating within a predetermined speed and load range in which the engine 102 is susceptible to stochastic pre-ignition.

Figure 2:
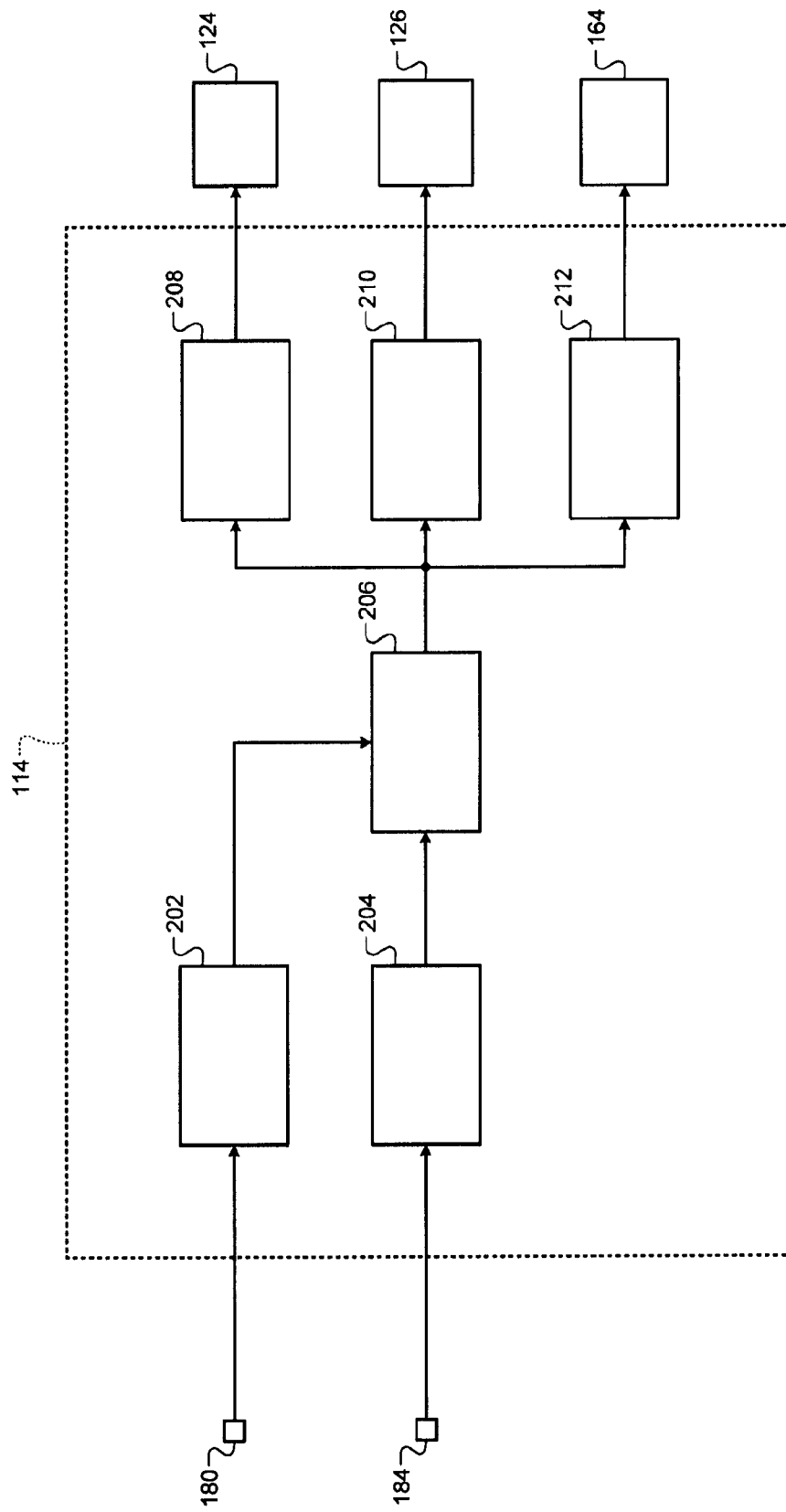
FIG. 2 is a functional block diagram of an example control system according to the principles of the present disclosure.

Referring to FIG. 2, an example implementation of the ECM 114 includes an engine speed module 202, an engine load module 204, a stochastic pre-ignition module 206, a fuel control module 208, a spark control module 210, and a boost control module 212. The engine speed module 202 determines engine speed. The engine speed module 202 may determine the engine speed based on input received from the CKP sensor 180. The engine speed module 202 may determine the engine speed based on an amount of crankshaft rotation between tooth detections and the corresponding period. The engine speed module 202 outputs the engine speed.

The engine load module 204 determines engine load. The engine load module 204 may determine the engine load based on input received from the MAP sensor 184. In various implementations, the pressure within the intake manifold 110 may be used as an indicator of engine load. The engine load module 204 outputs the engine load and/or the manifold pressure.

The stochastic pre-ignition module 206 determines whether operating conditions of the engine 102 satisfy predetermined criteria associated with stochastic pre-ignition. The operating conditions may include a first condition that satisfies the predetermined criteria when the engine speed is greater than or equal to a predetermined speed (e.g., 1500revolutions per minute). The operating conditions may include a second condition that satisfies the predetermined criteria when the engine load is greater than or equal to a predetermined load and/or when the manifold pressure is greater than or equal to a predetermined pressure (e.g., 60 kilopascals). The stochastic pre-ignition module 206 outputs a signal indicating whether the operating conditions of the engine 102 satisfy the predetermined criteria.

The fuel control module 208 sends a signal to the fuel actuator module 124 to control fuel injection into cylinders of the engine 102. The spark control module 210 sends a signal the spark actuator module 126 to control spark generation in cylinders of the engine 102. The boost control module 212 sends a signal the boost actuator module 164 to control boost in the engine 102.

The fuel control module 208 may adjust fuel injection in the engine 102 when the operating conditions of the engine 102 satisfy the predetermined criteria in order to prevent stochastic pre-ignition. For example, the fuel control module 208 may enrich an air/fuel ratio of the engine 102, execute multiple (e.g., two or more) fuel injection pulses for each combustion event, and/or advance fuel injection timing of the engine 102 when the predetermined criteria is satisfied. The fuel control module 208 may enrich the air/fuel ratio of the engine 102 by adjusting the air/fuel ratio from a normal air/fuel ratio (e.g., 14.7 to 1) to a rich air/fuel ratio (e.g., an air/fuel ratio between 10 to 1 and 12 to 1).

When executing multiple fuel injection pulses for each combustion event, the fuel control module 208 may ensure that each pulse of fuel is injected into a cylinder before spark is generated in the cylinder. When advancing fuel injection timing, the fuel control module 208 may advance the start of fuel injection by a predetermined amount relative to a normal start of fuel injection. For example, fuel injection may normally start at a crank angle between 40 and 50 degrees before TDC, and the fuel control module 208 may advance the start of fuel injection by 40 to 50 degrees relative to the normal start of fuel injection. Thus, the advanced fuel injection may start at a crank angle between 80 and 100 degrees before TDC.

The spark control module 210 may advance spark timing in the engine 102 and/or the boost control module 212 may reduce boost in the engine 102 when the operating conditions of the engine 102 satisfy the predetermined criteria. Reducing boost in the engine 102 may prevent stochastic pre-ignition in the engine 102. The boost control module 212 may reduce boost in the engine 102 when the spark timing in the engine 102 is advanced to ensure that the advanced spark timing does not cause the torque output of the engine 102 to overshoot a driver torque request.

Figure 3:
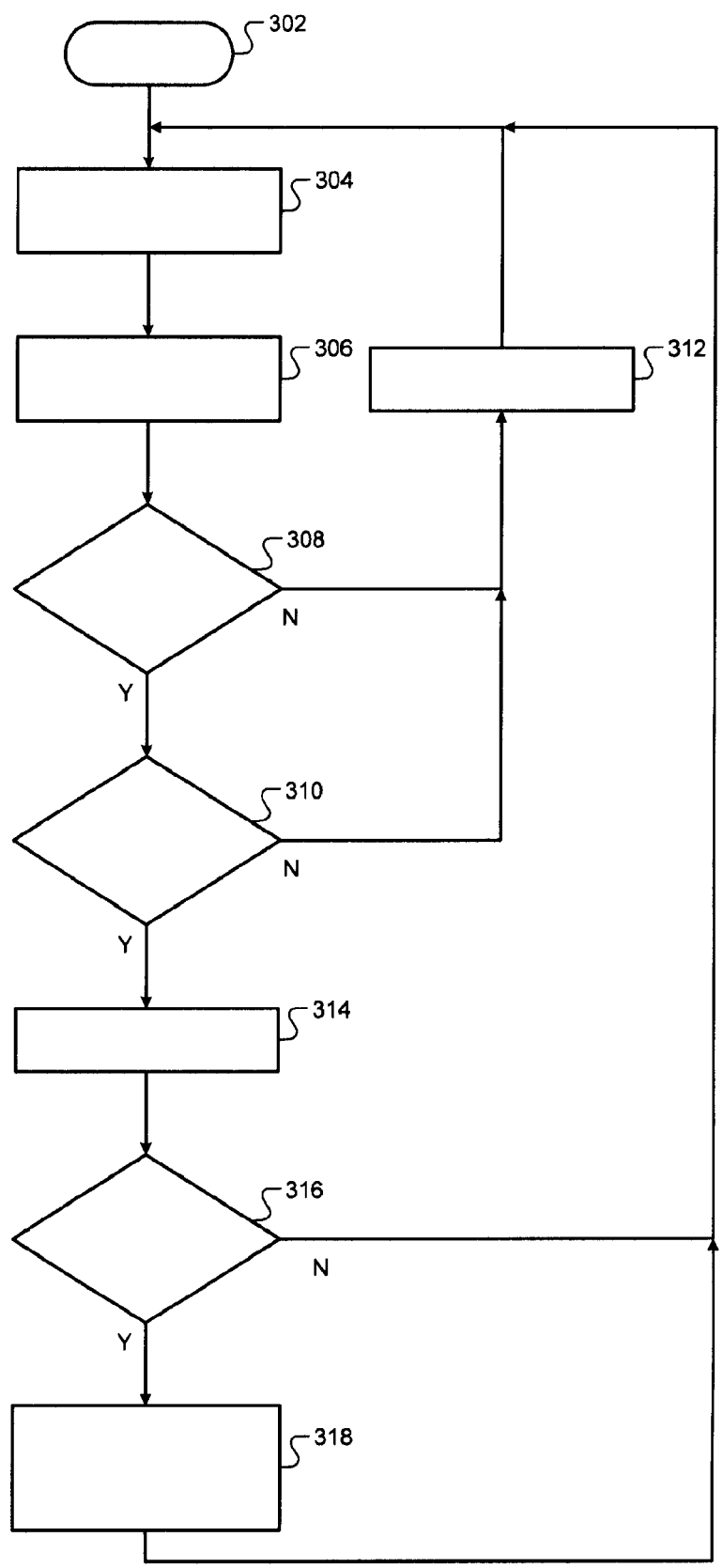
FIG. 3 is a flowchart illustrating an example control method according to the principles of the present disclosure.

Referring now to FIG. 3, a method for preventing stochastic pre-ignition in an engine begins at 302. At 304, the method determines an engine speed. The method may determine the engine speed based on input from a crankshaft position sensor. At 306, the method determines engine load. In various implementations, the method uses pressure within an intake manifold of the engine as an approximation of engine load.

At 308, the method determines whether the engine speed is greater than or equal to a first speed (e.g., 1500 rpm). The first speed may be predetermined. If the engine speed is greater than or equal to the first speed, the method continues at 310. Otherwise, the method continues at 312. At 312, the method resets a timer to zero. The timer indicates how long the engine speed and load satisfies certain criteria.

At 310, the method determines whether the engine load is greater than or equal to a first load. The method may determine that the engine load is greater than or equal to the first load when a manifold pressure is greater than or equal to a first pressure (e.g., 60 kPa). The first load and/or the first pressure may be predetermined. If the engine load is greater than or equal to the first load, the method continues at 314. Otherwise, the method continues at 312.

At 314, the method increments the timer. At 316, the method determines whether the period indicated by the timer is greater than or equal to a first period (e.g., 10 minutes). The first period may be predetermined. If the period indicated by the timer is greater than or equal to the first period, the method continues at 318. Otherwise, the method continues at 302.

At 318, the method enriches an air/fuel ratio of the engine, executes multiple fuel injection pulses for each combustion event in the engine, and/or advances fuel injection timing of the engine. The method may enrich the air/fuel ratio by adjusting the air/fuel ratio from a normal air/fuel ratio (e.g., 14.7 to 1) to a rich air/fuel ratio (e.g., a ratio between 10 to 1 and 12 to 1). The method may inject multiple pulses of fuel in a cylinder before spark is generated in the cylinder. The method may advance the start of fuel injection by a predetermined amount (e.g., between 40 and 50 degrees) relative to a normal start of fuel injection (e.g., between 40 and 50 degrees before TDC).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
    a stochastic pre-ignition module that determines whether an operating condition of an engine satisfies predetermined criteria associated with stochastic pre-ignition, wherein the engine operating condition includes at least one of a speed of the engine and a load on the engine, and wherein the engine operating condition satisfies the predetermined criteria when at least one of:
        the engine speed is greater than a first speed; and
        the engine load is greater than a first load; and
    a fuel control module that enriches an air/fuel ratio of the engine when the engine operating condition satisfy the predetermined criteria.

2. The system of claim 1 wherein the fuel control module enriches the air/fuel ratio of the engine when the engine operating condition satisfies the predetermined criteria for a first period.

3. The system of claim 1 wherein the engine operating condition includes the engine speed.

4. The system of claim 1 wherein the engine operating condition includes the engine load.

5. The system of claim 4 wherein the engine load is greater than the first load when a pressure within an intake manifold of the engine is greater than a first pressure.

6. The system of claim 1 wherein the fuel control module adjusts the air/fuel ratio to a first air/fuel ratio within a range between 10 to 1 and 12 to 1 when the engine operating condition satisfies the predetermined criteria.

7. The system of claim 1 wherein the fuel control module executes N fuel injection pulses for each combustion event in the engine when the engine operating condition satisfies the predetermined criteria, wherein N is an integer greater than one.

8. The system of claim 1 wherein the fuel control module advances fuel injection timing in the engine when the engine operating condition satisfies the predetermined criteria.

9. The system of claim 8 wherein the fuel control module advances the fuel injection timing by an amount corresponding to an amount of crankshaft rotation in the engine that is between 40 degrees and 50 degrees.

10. The system of claim 1 wherein:
    the stochastic pre-ignition module determines that the engine operating condition satisfies the predetermined criteria when the engine speed and the engine load are within predetermined ranges; and
    the fuel control module executes N fuel injection pulses for each combustion event in the engine and advances fuel injection timing in the engine when the engine operating condition satisfies the predetermined criteria, wherein N is an integer greater than one.

11. A method comprising:
    determining whether an operating condition of an engine satisfy predetermined criteria associated with stochastic pre-ignition, wherein the engine operating condition includes at least one of a speed of the engine and a load on the engine, and wherein the engine operating condition satisfies the predetermined criteria when at least one of:
        the engine speed is greater than a first speed; and
        the engine load is greater than a first load; and
    enriching an air/fuel ratio of the engine when the engine operating condition satisfy the predetermined criteria.

12. The method of claim 11 further comprising enriching the air/fuel ratio of the engine when the engine operating condition satisfies the predetermined criteria for a first period.

13. The method of claim 12 wherein the engine operating condition includes the engine speed.

14. The method of claim 13 wherein the engine operating condition includes the engine load.

15. The method of claim 14 wherein the engine load is greater than the first load when a pressure within an intake manifold of the engine is greater than a first pressure.

16. The method of claim 11 further comprising adjusting the air/fuel ratio to a first air/fuel ratio within a range between 10 to 1 and 12 to 1 when the engine operating condition satisfies the predetermined criteria.

17. The method of claim 11 further comprising executing N fuel injection pulses for each combustion event in the engine when the engine operating condition satisfies the predetermined criteria, wherein N is an integer greater than one.

18. The method of claim 11 further comprising advancing fuel injection timing in the engine when the engine operating condition satisfies the predetermined criteria.

19. The method of claim 18 further comprising advancing the fuel injection timing by an amount corresponding to an amount of crankshaft rotation in the engine that is between 40 degrees and 50 degrees.

20. The method of claim 11 further comprising:
    determining that the engine operating condition satisfies the predetermined criteria when the engine speed the engine load are within predetermined ranges; and
    executing N fuel injection pulses for each combustion event in the engine and advances fuel injection timing in the engine when the engine operating condition satisfies the predetermined criteria, wherein N is an integer greater than one.

* * * * *